US012559433B2

(12) United States Patent
Fang et al.

(10) Patent No.: US 12,559,433 B2
(45) Date of Patent: Feb. 24, 2026

(54) GRINDING AID FOR CEMENT AND PREPARATION METHOD THEREFOR

(71) Applicant: Jiahua Science & Technology Development (Shanghai) Ltd., Shanghai (CN)

(72) Inventors: Fuxian Fang, Shanghai (CN); Xinyao He, Shanghai (CN); Yubo Li, Shanghai (CN)

(73) Assignee: Jiahua Science & Technology Development (Shanghai) Ltd., Shanghai (CN)

( * ) Notice: Subject to any disclaimer, the term of this patent is extended or adjusted under 35 U.S.C. 154(b) by 1106 days.

(21) Appl. No.: 17/619,546

(22) PCT Filed: Nov. 10, 2021

(86) PCT No.: PCT/CN2021/129734
§ 371 (c)(1),
(2) Date: Dec. 15, 2021

(87) PCT Pub. No.: WO2023/035398
PCT Pub. Date: Mar. 16, 2023

(65) Prior Publication Data

US 2024/0051883 A1 Feb. 15, 2024

(30) Foreign Application Priority Data

Sep. 10, 2021 (CN) ........................ 202111064102.6

(51) Int. Cl.
*C04B 40/00* (2006.01)
*C04B 24/12* (2006.01)
*C04B 24/26* (2006.01)
*C04B 28/14* (2006.01)

(52) U.S. Cl.
CPC ........ *C04B 40/0039* (2013.01); *C04B 24/122* (2013.01); *C04B 24/2647* (2013.01); *C04B 28/141* (2013.01)

(58) Field of Classification Search
CPC .................................................... C04B 24/122
See application file for complete search history.

(56) References Cited

U.S. PATENT DOCUMENTS

| | | | | |
|---|---|---|---|---|
| 2008/0227890 A1 | 9/2008 | Maeder et al. | | |
| 2014/0005305 A1* | 1/2014 | Sagawa | C04B 40/0039 | 524/5 |

FOREIGN PATENT DOCUMENTS

| | | |
|---|---|---|
| CN | 102796234 | 11/2012 |
| CN | 103193936 | 7/2013 |
| CN | 103288657 | 9/2013 |
| CN | 105669909 | 6/2016 |
| CN | 107286297 | 10/2017 |
| CN | 109021188 | 12/2018 |
| CN | 112159149 | 1/2021 |
| CN | 112759723 | 5/2021 |
| KR | 100650135 | 11/2006 |

OTHER PUBLICATIONS

International Search Report and Written Opinion dated Jun. 7, 2022, PCT/CN2021/129734, 11 pages (including English translation of the Search Report).

First Office Action dated Dec. 1, 2022, CN Application No. 2021220641026, 8 pages (including partial English translation).

* cited by examiner

*Primary Examiner* — Michael F Pepitone
(74) *Attorney, Agent, or Firm* — Brownstein Hyatt Farber Schreck, LLP

(57) ABSTRACT

The present disclosure belongs to the technical field of preparation of functional materials, and in particular relates to a grinding aid for cement and a preparation method therefor. The components of the grinding aid include a modified alcohol amine of a specific structure and a polycarboxylic acid polymer of a specific structure, and a mass ratio of the modified alcohol amine to the polycarboxylic acid polymer is (1-10):(40-49), and the early strength of the cement can be increased, the water consumption can be reduced, and the fluidity can be improved when the grinding aid is used in cement. The present disclosure adopts the combined action of the modified alcohol amine and the polycarboxylic acid polymer in specific ratios and structures, so that a synergistic effect can be achieved, and the respective performance advantages can be fully exerted.

20 Claims, No Drawings

GRINDING AID FOR CEMENT AND PREPARATION METHOD THEREFOR

CROSS-REFERENCE TO RELATED APPLICATION

This application is a national phase application under 35 U.S.C. § 371 of PCT Application No. PCT/CN2021/129734, filed on Nov. 10, 2021, which claims priority to Chinese Application No. 202111064102.6, filed Sep. 10, 2021, the contents of which are incorporated herein by reference in their entirety.

TECHNICAL FIELD

The disclosure belongs to the technical field of preparation of functional materials, and in particular relates to a grinding aid for cement and a preparation method therefor.

BACKGROUND

Grinding aids have been used in crushing operations abroad for more than 70 years, and more than 50 substances have been studied as grinding aids since resin was used as a grinding aid in 1930. The research and application of grinding aids in China started late, in recent years, the research of grinding aids was highly valued by relevant colleges and universities, scientific research institutes and science and technology development companies, and a number of achievements have been made.

A cement grinding aid is a chemical additive that improves the grinding effect and performance of cement, can significantly improve the machine-hour output of cement, and the strength of cement at various ages, and improve its fluidity. As a chemical additive, the grinding aid can improve cement particle distribution and stimulate the hydration process, thereby increasing the early strength and late strength of cement, and improving the product quality. Currently, the traditional cement grinding aids include liquid grinding aids and solid grinding aids, the basic ingredients of which mostly belong to organic surface active substances, mainly amines, alcohols, alcohol amines, lignosulfonates, fatty acids and salts thereof, alkyl sulfonates, and the like.

The traditional grinding aids have obvious defects, which are mainly manifested in: first, the enhancement effect is limited, the adaptability is narrow, the stability is poor, and the use effect is not ideal; second, in order to achieve the effect of increasing production and enhancement, the mixing amount of grinding aid has to be increased, and the price of traditional grinding aid raw materials is high, and the cost controllability is poor due to the gradual rise in the price of international upstream petrochemical products; third, the traditional grinding aids cause certain harm to the environment. High-efficiency polycarboxylic acid grinding aids are a class of grinding aids with a comb structure synthesized by a molecular design method, which solves the defects of traditional composite or single-component grinding aids from the molecular structure, and has become a research hotspot in the field of grinding aids. However, existing polycarboxylic acid grinding aids are intended to improve the performance in a certain aspect, or to improve the grinding efficiency, or to improve the strength; in addition, the mixing amount of existing carboxylic acid grinders is also high, and for the art, there is a lack of a grinding aid that can have a variety of excellent properties at the same time.

SUMMARY

Therefore, the technical problem to be solved by the present disclosure is to overcome the defects of polycarboxylic acid grinding aids in the prior art, such as single performance, high mixing amount and inability to have a variety of properties at the same time, thereby providing a grinding aid for cement and a preparation method therefor.

Therefore, the present disclosure provides the following technical solutions.

The present disclosure provides a grinding aid for cement, including at least a modified alcohol amine and a polycarboxylic acid polymer at a mass ratio of (1-10):(40-49); wherein, the modified alcohol amine has the following structural formula,

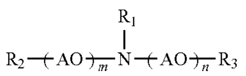

wherein $R_1$ is selected from methyl, ethyl, propyl or isopropyl; $R_2$ is selected from hydrogen, methyl, ethyl, propyl or isopropyl; $R_3$ is selected from hydrogen, methyl, ethyl, propyl or isopropyl; and AO represents $CH_2CH_2O$ and/or $CH(CH_3)CH_2O$;

m is an integer from 0 to 5, n is an integer from 0 to 5, and $m+n\geq 1$;

the polycarboxylic acid polymer has the following structural formula,

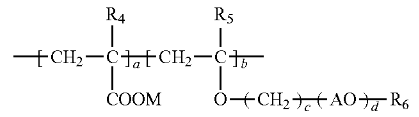

wherein a is an integer from 30 to 100; b is an integer from 5 to 50; c is an integer from 0 to 10; and d is an integer from 90 to 200; and $R_4$ is selected from hydrogen or methyl; $R_5$ is selected from hydrogen or methyl; and $R_6$ is selected from hydrogen, methyl, ethyl, propyl or isopropyl.

Further, $R_1$ is selected from methyl or ethyl; $R_2$ is selected from hydrogen or methyl; $R_3$ is selected from hydrogen or methyl; m+n=1-2; and a ratio of a to b is (10-15):1.

The modified alcohol amine is at least one of N-methylethanolamine, N-methyldiethanolamine, N-methylisopropanolamine, and N-methyldiisopropanolamine; and the polycarboxylic acid polymer has a weight average molecular weight of 20000-80000 g/mol.

The present disclosure provides a preparation method for the grinding aid for cement as described above, including uniformly mixing a modified alcohol amine and a polycarboxylic acid polymer to obtain the grinding aid for cement.

Further, an alcohol amine is modified by alkylation to obtain the modified alcohol amine;

preferably, the alkylation modification includes specific steps of reacting the alcohol amine with an aldehyde to obtain a Schiff base intermediate, and then reacting the Schiff base intermediate with formic acid to obtain the modified alcohol amine.

The alkylation modification includes specific steps of reacting the alcohol amine with the aldehyde at 20-60° C. for 0.5-3 h to obtain a Schiff base intermediate, then adding dropwise the Schiff base intermediate to formic acid, and carrying out a reaction for 2-4 h after adding dropwise is finished to obtain the modified alcohol amine, wherein the temperature is controlled to be 20-60° C., and the time for adding dropwise is 0.5-2 h.

A molar ratio of the alcohol amine to the aldehyde to formic acid is 1:(1-2):(1-2);

the alcohol amine is reacted with the aldehyde at a temperature of 20-60° C. for 0.5-3 h; and the Schiff base intermediate is reacted with formic acid at a temperature of 20-60° C.

The alcohol amine is at least one of ethanolamine, diethanolamine, isopropanolamine, and diisopropanolamine;

the aldehyde is a formaldehyde aqueous solution or paraformaldehyde, preferably paraformaldehyde; and the formic acid is a formic acid aqueous solution with a volume fraction of 80-85% or an anhydrous formic acid.

A preparation method for the polycarboxylic acid polymer includes carrying out a polymerization reaction of a polyether macromonomer and an unsaturated carboxylic acid under the action of an initiator to obtain the polycarboxylic acid polymer.

the polymerization reaction is carried out at a temperature of 5-50° C.;

the polyether macromonomer has a weight average molecular weight of 4000-8000 g/mol;

a molar ratio of the polyether macromonomer to the unsaturated carboxylic acid is 1:(10-15); and the weight average molecular weights of the polyether macromonomer and a polycarboxylic acid copolymer were determined by gel permeation chromatography (GPC) with polyethylene glycol (PEG) as a standard substance.

The initiator is a redox system initiator, and the molar amount of an oxidizing agent in the initiator is 1-10% of the total molar amount of monomers; and the molar amount of a reducing agent in the initiator is 20-50% of the molar amount of the oxidizing agent.

Further, the preparation method further includes a step of adding a chain transfer agent during the preparation of the polycarboxylic acid polymer; wherein, the chain transfer agent is used in an amount of 1-5% of the total molar amount of the monomers; and the chain transfer agent is at least one of mercaptoethanol, thioglycolic acid, mercaptopropionic acid, and sodium hypophosphite.

The oxidizing agent in the redox system initiator can be, but is not limited to, hydrogen peroxide, ammonium persulfate and sodium persulfate; the reducing agent can be, but is not limited to, ascorbic acid, sodium bisulfite, sodium formaldehyde sulfoxylate and E51; and a solvent used in the preparation process can be, but is not limited to, water, methanol, ethanol and isopropanol.

The technical solutions of the present disclosure have the following advantages:

1. According to the grinding aid for cement provided by the present disclosure, the components of the grinding aid include the modified alcohol amine of the specific structure and the polycarboxylic acid polymer of the specific structure, and the mass ratio of the modified alcohol amine to the polycarboxylic acid polymer is (1-10):(40-49), and the early strength of the cement can be increased, the water consumption can be reduced, and the fluidity can be improved when the grinding aid is used in cement. The present disclosure adopts the combined action of the modified alcohol amine and the polycarboxylic acid polymer in specific ratios and structures, so that a synergistic effect can be achieved, and the respective performance advantages can be fully exerted.

As one of the effective ingredients of a cement grinding agent, the modified alcohol amine of the specific structure can not only improve the early strength and late strength of cement, but also effectively improve the machine-hour output of a grinder; after the polycarboxylic acid polymer of the specific structure of the present disclosure is added to the cement grinding agent, the early strength of the cement can be improved, the water consumption can be reduced, and the fluidity of the cement can be improved.

2. According to the grinding aid for cement provided by the present disclosure, compared with polymers such as methoxy polyethylene glycol acrylate, allyl polyoxyethylene ether, methyl allyl polyoxyethylene ether, isopentenyl polyoxyethylene ether and 4-hydroxybutyl vinyl polyoxyethylene ether in the prior art, an ethyleneoxy polymer is used as a main raw material in the present disclosure, which is obviously superior to the raw materials in the prior art in performance and production cost.

By optimizing the structure of the modified alcohol amine and the structure of the polycarboxylic acid copolymer, the early strength and late strength of cement can be further improved; the polycarboxylic acid polymer with a specific molecular weight can further reduce the water consumption and improve the fluidity on the basis of optimizing the early strength of the cement.

3. The preparation method for the grinding aid for cement provided by the present disclosure is simple and convenient, has high operability, has low requirements for equipment and is likely to realize large-scale production.

The modified alcohol amine of the present disclosure is obtained by alkylation modification of the alcohol amine, which overcomes the shortcomings of the traditional ethoxylation reaction, such as large investment, flammability and explosion of ethylene oxide, many by-products, rectification and purification of products, complicated process, etc., and has the advantages of high yield, few by-products, mild reaction, simple process and low cost; as a component of a grinding agent for cement, the modified alcohol amine after alkylation modification can improve the early strength and late strength of the cement, the machine-hour output of the grinder and the fluidity of cement.

DETAILED DESCRIPTION

The following embodiments are provided for a better understanding of the disclosure, are not limited to the preferred embodiments, and do not limit the content and protection scope of the disclosure. Any product that is the same or similar to the disclosure, obtained by anyone under the enlightenment of the disclosure or by combining the disclosure with the features of other prior arts falls within the protection scope of the disclosure.

The specific experimental steps or conditions which are not indicated in the embodiments can be carried out according to the operations or conditions of the conventional experimental steps described in the literature in the art. The reagents or instruments used without the manufacturer indicated are commercially available conventional reagent products.

Embodiment 1

This embodiment provides modified alcohol amines numbered I-1, 1-2, 1-3, and I-4, respectively, and a preparation method thereof, the raw materials used to prepare the modified alcohol amines with different numbers are shown in Table 1, the number of groups in the structural formula of each modified alcohol amine and the effective content in the obtained modified alcohol amine are shown in table 2, and the preparation method includes the following steps, the alcohol amine was mixed with paraformaldehyde, the mixture was heated to 50° C. and stirred for 2 h until the paraformaldehyde was fully reacted to form a Schiff base intermediate, and the Schiff base intermediate was then transferred to a constant pressure dropping funnel; and anhydrous formic acid was added to a flask, and stirred at room temperature, the Schiff base intermediate was slowly added dropwise into the flask, while the temperature was controlled to be 60° C., and heat preservation was performed for 2 h after adding dropwise, wherein the time for adding dropwise was 1 h; and a small amount of water was removed under vacuum to obtain the modified alcohol amine with an effective content (GC) of 98%.

TABLE 1

Raw materials for preparation of each numbered modified alcohol amine

| Number/raw materials | alcohol amine chemical name/mass (g) | Paraformaldehyde (g) | Anhydrous formic acid (g) |
|---|---|---|---|
| I-1 | diisopropanolamine/133 | 35 | 51 |
| I-2 | ethanolamine/61 | 35 | 51 |
| I-3 | isopropanolamine/75 | 35 | 51 |
| I-4 | diethanolamine/105 | 35 | 51 |

TABLE 2

Number of groups in each modified alcohol amine and content of modified alcohol amine

| Number | $R_1$ | AO | $R_2$ | $R_3$ | m | n | Modified alcohol amine/GC (%) |
|---|---|---|---|---|---|---|---|
| I-1 | $CH_3$ | EO | H | $H_3$ | 1 | 0 | N-methyldiisopropanolamine/98 |
| I-2 | $CH_3$ | EO | H | H | 1 | 1 | N-methylethanolamine/99 |
| I-3 | $CH_3$ | PO | H | H | 0 | 1 | N-methylisopropanolamine/99 |
| I-4 | $CH_3$ | PO | H | H | 1 | 1 | N-methyldiethanolamine/98 |

Embodiment 2

This embodiment provides polycarboxylic acid polymers numbered II-1, II-2, II-3 and II-4, respectively, and preparation methods thereof. The number of groups in the structural formula of each numbered polycarboxylic acid polymer is shown in Table 3, specifically as follows, The preparation method of the polycarboxylic acid polymer numbered II-1 includes the following steps:

500 g of EPEG5000 (ethylene glycol vinyl ether polyoxyethylene ether with a molecular weight of 5000) and 330 g of water were added to a flask and dissolved under stirring; 2.4 g of 30% hydrogen peroxide was added, and the temperature was controlled at 20±2° C.; 79.2 g of acrylic acid, 100 g of water and 3.5 g of mercaptopropionic acid were uniformly stirred to form a mixed solution A, 100 g of water and 0.6 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 80 g of 30% liquid sodium hydroxide was added to adjust pH, and the mixture was uniformly stirred to obtain a colorless viscous liquid, i.e., the polycarboxylic acid polymer numbered II-1, with a molecular weight of 45000 g/mol.

The preparation method of the polycarboxylic acid polymer numbered II-2 includes the following steps:

500 g of EPEG5000 and 330 g of water were added to a flask and dissolved under stirring; 2.4 g of 30% hydrogen peroxide was added, and the temperature was controlled at 20±2° C.; 79.2 g of acrylic acid, 95 g of water and 4 g of mercaptopropionic acid were uniformly stirred to form a mixed solution A, 100 g of water and 0.6 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 75 g of 30% liquid sodium hydroxide was added to adjust pH, and the mixture was uniformly stirred to obtain a colorless viscous liquid, i.e., the polycarboxylic acid polymer numbered II-2, with a molecular weight of 46000 g/mol.

The preparation method of the polycarboxylic acid polymer numbered II-3 includes the following steps:

600 g of EPEG6000 and 400 g of water were added to a flask and dissolved under stirring; 2.4 g of 30% hydrogen peroxide was added, and the temperature was controlled at 20±2° C.; 72 g of acrylic acid, 90 g of water and 3.5 g of mercaptopropionic acid were uniformly stirred to form a mixed solution A, 130 g of water and 0.6 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 70 g of 30% liquid sodium hydroxide was added, and the mixture was uniformly stirred to obtain a colorless viscous liquid, i.e., the polycarboxylic acid polymer numbered II-3, with a molecular weight of 50000 g/mol.

The preparation method of the polycarboxylic acid polymer numbered II-4 includes the following steps:

600 g of EPEG6000 (ethylene glycol vinyl ether polyoxyethylene ether with a molecular weight of 6000) and 400 g of water were added to a flask and dissolved under stirring; 2.4 g of 30% hydrogen peroxide was added, and the temperature was controlled at 20±2° C.; 79.2 g of acrylic acid, 100 g of water and 4 g of mercaptopropionic acid were uniformly stirred to form a mixed solution A, XXg of water and XXg of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 75 g of 30% liquid sodium hydroxide was added, and the mixture was uniformly stirred to obtain a colorless viscous liquid, i.e., the polycarboxylic acid polymer numbered II-4, with a molecular weight of 52000 g/mol.

TABLE 3

| Number of groups in each polycarboxylic acid polymer | | | | | | | | |
|---|---|---|---|---|---|---|---|---|
| Number | a:b | AO | $R_4$ | $R_5$ | $R_6$ | c | d | Mw |
| II-1 | 10 | EO | H | H | H | 2 | 110 | 45000 |
| II-2 | 11 | EO | H | H | H | 2 | 110 | 46000 |
| II-3 | 10 | EO | H | H | H | 2 | 140 | 50000 |
| II-4 | 11 | EO | H | H | H | 2 | 140 | 52000 |

Embodiment 3

This embodiment provides grinding aids numbered III-1, 111-2, 111-3, 111-4 and 111-5, respectively. A preparation method of the grinding aids includes uniformly mixing a modified alcohol amine and a polycarboxylic acid polymer to obtain the grinding aid. The ratios of raw materials for each numbered grinding aid are shown in Table 4. In Table 4, I/II (converted into solid %) is a mass ratio of the effective solid content in the modified alcohol amine to the effective solid content in the polycarboxylic acid polymer;

TABLE 4

| Mass ratio of components in grinding aids | | | |
|---|---|---|---|
| Number | Modified alcohol amine I | Polycarboxylic acid polymer II | I/II (converted into solid %) |
| III-1 | I-1 | II-1 | 4/95 |
| III-2 | I-2 | II-2 | 5/95 |
| III-3 | I-3 | II-3 | 8/92 |
| III-4 | I-4 | II-4 | 6/94 |
| III-5 | I-3 | II-4 | 10/90 |

Comparative Example 1

This comparative example provides alcohol amines numbered I-5, I-6, I-7 and I-9, respectively, specifically, I-5 is triethanolamine; I-6 is triisopropanolamine; I-7 is diethanol monoisopropanolamine; I-8 is monoethanol diisopropanolamine.

Comparative Example 2

This comparative example provides polycarboxylic acid polymers numbered II-5, II-6, II-7, II-8, II-9 and II-10 and preparation methods thereof, specifically as follows:

The preparation method of the polycarboxylic acid polymer numbered II-5 includes the following steps:

240 g of SPEG2400 (methyl allyl polyoxyethylene ether with a molecular weight of 2400) and 160 g of water were added to a flask and dissolved under stirring; 3 g of 30% hydrogen peroxide was added, and the temperature was controlled at 20±2° C.; 28.8 g of acrylic acid, 30 g of water and 1.6 g of mercaptopropionic acid were uniformly stirred to form a mixed solution A, 50 g of water and 0.4 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 30 g of 30% liquid sodium hydroxide was added, and the mixture was uniformly stirred to obtain a colorless viscous liquid, i.e., the polycarboxylic acid polymer numbered II-5, with Mw of 23000.

The preparation method of the polycarboxylic acid polymer numbered II-6 includes the following steps:

500 g of SPEG5000 (methyl allyl polyoxyethylene ether with a molecular weight of 5000) and 330 g of water were added to a flask and dissolved under stirring; 3.4 g of 30% hydrogen peroxide was added, and the temperature was controlled at 20±2° C.; 36 g of acrylic acid, 80 g of water and 2 g of mercaptopropionic acid were uniformly stirred to form a mixed solution A, 100 g of water and 0.5 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 35 g of 30% liquid sodium hydroxide was added, and the mixture was uniformly stirred to obtain a colorless viscous liquid, i.e., the polycarboxylic acid polymer numbered II-6, with Mw of 53000.

The preparation method of the polycarboxylic acid polymer numbered II-7 includes the following steps:

240 g of TPEG2400 (isopentenyl polyoxyethylene ether with a molecular weight of 2400) and 160 g of water were added to a flask and dissolved under stirring; 3 g of 30% hydrogen peroxide was added, and the temperature was controlled at 20±2° C.; 28.8 g of acrylic acid, 30 g of water and 1.6 g of mercaptopropionic acid were uniformly stirred to form a mixed solution A, 50 g of water and 0.4 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 30 g of 30% liquid sodium hydroxide was added, and the mixture was uniformly stirred to obtain a colorless viscous liquid, i.e., the polycarboxylic acid polymer numbered II-7, with Mw of 21000.

The preparation method of the polycarboxylic acid polymer numbered II-8 includes the following steps:

500 g of TPEG5000 (isopentenyl polyoxyethylene ether with a molecular weight of 5000) and 330 g of water were added to a flask and dissolved under stirring; 3.4 g of 30% hydrogen peroxide was added, and the temperature was controlled at 20±2° C.; 36 g of acrylic acid, 80 g of water and 2 g of mercaptopropionic acid were uniformly stirred to form a mixed solution A, 100 g of water and 0.5 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 35 g of 30% liquid sodium hydroxide was added, and the mixture was uniformly stirred to obtain a colorless viscous liquid, i.e., the polycarboxylic acid polymer numbered II-8, with Mw of 50000.

The preparation method of the polycarboxylic acid polymer numbered II-9 includes the following steps:

300 g of VPEG3000 (4-hydroxybutyl vinyl polyoxyethylene ether with a molecular weight of 3000) and 200 g of water were added to a flask and dissolved under stirring; 3 g of 30% hydrogen peroxide was added, and the temperature was controlled at 20±2° C.; 28.8 g of acrylic acid, 60 g of water and 1.6 g of mercaptopropionic acid were uniformly stirred to form a mixed solution A, 50 g of water and 0.4 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 30 g of 30% liquid sodium hydroxide was added, and the mixture was uniformly stirred to obtain a colorless viscous liquid, i.e., the polycarboxylic acid polymer numbered II-9, with Mw of 32000.

The preparation method of the polycarboxylic acid polymer numbered II-10 includes the following steps:

600 g of VPEG6000 (4-hydroxybutyl vinyl polyoxyethylene ether with a molecular weight of 6000) and 400 g of water were added to a flask and dissolved under stirring; 2.4 g of 30% hydrogen peroxide was added, and the temperature was controlled at 20±2° C.; 43.2 g of acrylic acid, 100 g of water and 2.5 g of mercaptopropionic acid were uniformly stirred to form a mixed solution A, 100 g of water and 0.4 g of E51 were uniformly mixed to form a mixed solution B, and the mixed solution A and the mixed solution B were simultaneously added dropwise to the flask, wherein the time for adding dropwise the mixed solution A was 1 h, the time for adding dropwise the mixed solution B was 1.1 h, and the reaction temperature was 30±5° C.; and heat preservation was performed for 1 h after the adding dropwise, 40 g of 30% liquid sodium hydroxide was added, and the mixture was uniformly stirred to obtain a colorless viscous liquid, i.e., the polycarboxylic acid polymer numbered II-10, with Mw of 58000.

Comparative Example 3

This comparative example provides grinding aids numbered III-6 and III-7 and a preparation method thereof. The preparation method is the same as that in Embodiment 3. The components and ratios in the grinding aids are shown in Table 5.

TABLE 5

Mass ratio of components in grinding aids

| Number | Modified alcohol amine I | Polycarboxylic acid polymer II | I/II (converted into solid %) |
|---|---|---|---|
| III-6 | I-4 | II-4 | 30/70 |
| III-7 | I-4 | II-4 | 40/60 |

Test Example 1

This test example provides that different polycarboxylic acid polymers were added to cement as grinding agents, and the performance of the cement was tested. The test results are shown in Table 7; and cement 1 and cement 2 were prepared according to Table 6;

TABLE 6

Ratio of raw materials for different cement

| Components | Cement 1 | Cement 2 |
|---|---|---|
| Clinker | 95 | 75 |
| Gypsum dihydrate | 5 | 5 |
| Slag | / | 20 |

Cement grinding method: a polycarboxylic acid polymer was added into cement 1, wherein the mixing amount is shown in Table 6; and the mixture was ground in a ball mill TS100 at the grinding temperature of 110° C., wherein the amount of the cement 1 used was 20 kg. Then the properties (water demand, strength and fluidity) of the ground cement were tested. The test methods and results are as follows, wherein a blank group refers to the performance test result of the cement 1 without addition of the polycarboxylic acid polymer:

The test method of cement fluidity: a mortar ratio: 450 g of cement, 1350 g of standard sand, and 225 g of water. The fluidity is tested according to GB/T2419-2005.

The test method of cement strength: after forming by 450 g of cement, 1350 g of standard sand, and 225 g of water, standard curing was conducted, and the strength of each age was tested according to GB/T17671-1999.

The test method of water demand: test was conducted according to the method of GB/T1346-2011.

TABLE 7

Performance test results of cement after addition of the polycarboxylic acid polymer

| Grinding aids | Mixing amount (converted into solid %) | Water demand (%) | Fluidity (cm) | 1 D strength (MPa) | 7 D strength (MPa) | 28 D strength (MPa) |
|---|---|---|---|---|---|---|
| Blank | / | 25 | 20 | 19 | 28 | 42 |
| II-1 | 0.02 | 23.9 | 22.1 | 20.9 | 29.9 | 42.4 |
| II-2 | 0.02 | 23.8 | 22.3 | 21 | 30 | 42.6 |
| II-3 | 0.02 | 24 | 21.5 | 20.8 | 29.7 | 42.5 |
| II-4 | 0.02 | 23.7 | 22.7 | 21.4 | 31.2 | 42.9 |
| II-5 | 0.02 | 24.3 | 21.2 | 18.7 | 27.9 | 42.2 |
| II-6 | 0.02 | 24.9 | 19.8 | 19 | 28 | 42 |
| II-7 | 0.02 | 25.9 | 18.9 | 18.8 | 28 | 42 |
| II-8 | 0.02 | 25.7 | 19.2 | 18.9 | 28.2 | 41.9 |
| II-9 | 0.02 | 25 | 20 | 19 | 27.8 | 42 |
| II-10 | 0.02 | 26 | 19 | 18 | 27 | 42 |

Through the above test results, it can be seen that the application of the polycarboxylic acid polymer of the specific structure of the disclosure as a cement grinding agent in cement can reduce the water demand of grinding cement, improve the fluidity, and improve the early strength. On the whole, the effect of the polycarboxylic acid polymer of the specific structure of the disclosure is better than other polycarboxylic acid polymers (II-5 to II-10, such as methoxy polyethylene glycol methacrylate, allyl polyoxyethylene ether, methyl allyl polyoxyethylene ether, isopentenyl polyoxyethylene ether and 4-hydroxybutyl vinyl polyoxyethylene ether).

Test Example 2

This test example provides the alcohol amine provided in Comparative example 1 as an grinding agent, and the grinding agents obtained in Embodiment 3 and Comparative example 3 are added to cement, and the properties of the cement were tested, specifically as follows:

Cement grinding method: a grinding agent was added into cement 2, wherein the mixing amount is shown in Table 8 and Table 9; and the mixture was ground in a ball mill 18100 at the grinding temperature of 110° C., wherein the amount of the cement 2 used was 20 kg. Then the properties (water demand, strength and fluidity) of the ground cement were tested. The test methods refer to test example 1, and the test results are shown in Tables 8 and 9, wherein a blank groups in Table 8 and Table 9 refer to the performance test results of the cement 2 without addition of the grinding agent:

TABLE 8

Performance test results of cement after addtion of the alcohol amine

| Grinding aids | Mixing amount (converted into solid %) | Water demand (%) | Fluidity (cm) | Mill output (tons/h) | Energy consumption (kWhr/ton) | 1 D strength (MPa) | 7 D strength (MPa) | 28 D strength (MPa) |
|---|---|---|---|---|---|---|---|---|
| Blank | / | 27 | 23 | 92 | 44 | 15 | 28 | 43 |
| I-5 | 0.02 | 27.3 | 22.4 | 96 | 42 | 17 | 29 | 43 |
| I-6 | 0.02 | 27.6 | 22.8 | 97 | 41.8 | 15.3 | 28.3 | 45 |
| I-7 | 0.02 | 26.8 | 23.5 | 96 | 42 | 17.3 | 29.3 | 43.1 |
| I-8 | 0.02 | 27.7 | 22.3 | 97 | 41.8 | 15.3 | 28 | 45 |

TABLE 9

Performance test results of cement after addition of the grinding aids in Embodiment 3 and Comparative example 3

| Grinding aids | Mixing amount (converted into solid %) | Water demand (%) | Fluidity (cm) | Mill output (tons/h) | Energy consumption (kWhr/ton) | 1 D Strength (MPa) | 7 D Strength (MPa) | 28 D Strength (MPa) |
|---|---|---|---|---|---|---|---|---|
| Blank | / | 27 | 23 | 92 | 44 | 15 | 28 | 43 |
| III-1 | 0.02 | 26 | 25 | 99 | 41.8 | 17.5 | 30.3 | 45 |
| III-2 | 0.02 | 26.2 | 24.8 | 98 | 42.2 | 17.8 | 30.3 | 45.5 |
| III-3 | 0.02 | 26.2 | 24.8 | 97 | 42.3 | 18.3 | 30 | 45 |
| III-4 | 0.02 | 25.5 | 25.5 | 101 | 41.5 | 17.8 | 29.9 | 44.9 |
| III-5 | 0.02 | 25.3 | 25.2 | 103 | 41.3 | 17.6 | 30.5 | 45.9 |
| III-6 | 0.02 | 27 | 23 | 94 | 42.2 | 15.5 | 28.3 | 43.2 |
| III-7 | 0.02 | 27.8 | 23.8 | 93 | 42.5 | 15.7 | 27.9 | 43.3 |
| III-4 | 0.015 | 25.8 | 24.9 | 99 | 41.5 | 17.8 | 29.9 | 44.9 |
| III-5 | 0.015 | 26 | 25 | 97 | 41.8 | 17 | 30 | 45 |

From the test results in Table 8 and table 9, it can be seen that compared with traditional grinding agents (such as triethanolamine, triisopropanolamine, diethanol monoisopropanolamine, etc.), the grinding agent for cement provided by the disclosure can reduce the water consumption, improve the fluidity, and improve the early strength and late strength of cement. On the whole, the comprehensive performance of the grinding agent provided by the disclosure is significantly improved.

Obviously, the above-mentioned embodiments are merely examples for clear description, and are not intended to limit the implementation manners. For those of ordinary skill in the art, other changes or modifications in different forms can be made on the basis of the above description. It is unnecessary and impossible to enumerate all the implementation methods here. The obvious changes or modifications derived therefrom are still within the protection scope of the present disclosure.

What is claimed is:

1. A grinding aid for cement, comprising at least a modified alcohol amine and a polycarboxylic acid polymer at a mass ratio of (1-10):(40-49); wherein, the modified alcohol amine has the following structural formula

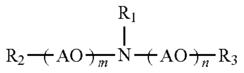

wherein $R_1$ is selected from methyl, ethyl, propyl or isopropyl; $R_2$ is selected from hydrogen, methyl, ethyl, propyl or isopropyl; $R_3$ is selected from hydrogen, methyl, ethyl, propyl or isopropyl; and AO represents $CH_2CH_2O$ and/or $CH(CH_3)$ $CH_2O$;

m is an integer from 0 to 5, n is an integer from 0 to 5, and m+n≥1;

the polycarboxylic acid polymer has the following structural formula,

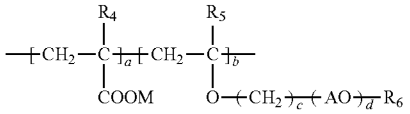

wherein a is an integer from 30 to 100; b is an integer from 5 to 50; c is an integer from 0 to 10; and d is an integer from 90 to 200; and $R_4$ is selected from hydrogen or methyl; $R_5$ is selected from hydrogen or methyl; and $R_6$ is selected from hydrogen, methyl, ethyl, propyl or isopropyl.

2. The grinding aid for cement according to claim 1, wherein $R_1$ is selected from methyl or ethyl; $R_2$ is selected from hydrogen or methyl; $R_3$ is selected from hydrogen or methyl; m+n=1-2; and a ratio of a to b is (10-15):1.

3. The grinding aid for cement according to claim 1, wherein the modified alcohol amine is at least one of N-methylethanolamine, N-methyldiethanolamine, N-methylisopropanolamine, and N-methyldiisopropanolamine; and the polycarboxylic acid polymer has a weight average molecular weight of 20000-80000 g/mol.

4. A preparation method for the grinding aid for cement according to claim 1, comprising uniformly mixing a modified alcohol amine and a polycarboxylic acid polymer to obtain the grinding aid for cement.

5. The preparation method according to claim 4, wherein an alcohol amine is modified by alkylation to obtain the modified alcohol amine, comprising:

reacting the alcohol amine with an aldehyde to obtain a Schiff base intermediate; and reacting the Schiff base intermediate with formic acid to obtain the modified alcohol amine.

6. The preparation method according to claim 5, wherein a molar ratio of the alcohol amine to the aldehyde to the formic acid is 1:(1-2):(1-2);

the alcohol amine is reacted with the aldehyde at a temperature of 20-60° C. for 0.5-3 h; and the Schiff base intermediate is reacted with the formic acid at a temperature of 20-60° C.

7. The preparation method according to claim 5, wherein the alcohol amine is at least one of ethanolamine, diethanolamine, isopropanolamine, and diisopropanolamine;

the aldehyde is a formaldehyde aqueous solution or paraformaldehyde; and the formic acid is a formic acid aqueous solution with a volume fraction of 80-85% or an anhydrous formic acid.

8. The preparation method according to claim 4, wherein a preparation method for the polycarboxylic acid polymer comprises carrying out a polymerization reaction of a polyether macromonomer and an unsaturated carboxylic acid under the action of an initiator to obtain the polycarboxylic acid polymer.

9. The preparation method according to claim 8, wherein the polymerization reaction is carried out at a temperature of 5-50° C.;

the polyether macromonomer has a weight average molecular weight of 4000-8000 g/mol;

a molar ratio of the polyether macromonomer to the unsaturated carboxylic acid is 1:(10-15); and the initiator is a redox system initiator, and the molar amount of an oxidizing agent in the initiator is 1-10% of the total molar amount of monomers; and the molar amount of a reducing agent in the initiator is 20-50% of the molar amount of the oxidizing agent.

10. The preparation method according to claim 8, further comprising a step of adding a chain transfer agent during the preparation of the polycarboxylic acid polymer; wherein, the chain transfer agent is used in an amount of 1-5% of the total molar amount of the monomers; and the chain transfer agent is at least one of mercaptoethanol, thioglycolic acid, mercaptopropionic acid, and sodium hypophosphite.

11. The grinding aid for cement according to claim 2, wherein the modified alcohol amine is at least one of N-methylethanolamine, N-methyldiethanolamine, N-methylisopropanolamine, and N-methyldiisopropanolamine; and the polycarboxylic acid polymer has a weight average molecular weight of 20000-80000 g/mol.

12. The preparation method for the grinding aid for cement according to claim 4, comprising uniformly mixing a modified alcohol amine and a polycarboxylic acid polymer to obtain the grinding aid for cement, wherein $R_1$ is selected from methyl or ethyl; $R_2$ is selected from hydrogen or methyl; $R_3$ is selected from hydrogen or methyl; m+n=1-2; and a ratio of a to b is (10-15):1.

13. The preparation method for the grinding aid for cement according to claim 4, comprising uniformly mixing a modified alcohol amine and a polycarboxylic acid polymer to obtain the grinding aid for cement, wherein the modified alcohol amine is at least one of N-methylethanolamine, N-methyldiethanolamine, N-methylisopropanolamine, and N-methyldiisopropanolamine; and the polycarboxylic acid polymer has a weight average molecular weight of 20000-80000 g/mol.

14. The preparation method according to claim 6, wherein the alcohol amine is at least one of ethanolamine, diethanolamine, isopropanolamine, and diisopropanolamine;

the aldehyde is a formaldehyde aqueous solution or paraformaldehyde; and the formic acid is a formic acid aqueous solution with a volume fraction of 80-85% or an anhydrous formic acid.

15. The preparation method according to claim 5, wherein a preparation method for the polycarboxylic acid polymer comprises carrying out a polymerization reaction of a polyether macromonomer and an unsaturated carboxylic acid under the action of an initiator to obtain the polycarboxylic acid polymer.

16. The preparation method according to claim 6, wherein a preparation method for the polycarboxylic acid polymer comprises carrying out a polymerization reaction of a polyether macromonomer and an unsaturated carboxylic acid under the action of an initiator to obtain the polycarboxylic acid polymer.

17. The preparation method according to claim 7, wherein a preparation method for the polycarboxylic acid polymer comprises carrying out a polymerization reaction of a polyether macromonomer and an unsaturated carboxylic acid under the action of an initiator to obtain the polycarboxylic acid polymer.

18. The preparation method according to claim 9, further comprising a step of adding a chain transfer agent during the preparation of the polycarboxylic acid polymer; wherein, the chain transfer agent is used in an amount of 1-5% of the total molar amount of the monomers; and the chain transfer agent is at least one of mercaptoethanol, thioglycolic acid, mercaptopropionic acid, and sodium hypophosphite.

19. The preparation method according to claim 5, wherein, the alkylation modification comprises specific steps of reacting the alcohol amine with an aldehyde to obtain a Schiff base intermediate, and then reacting the Schiff base intermediate with formic acid to obtain the modified alcohol amine.

20. The preparation method according to claim 7, wherein, the aldehyde is paraformaldehyde.

* * * * *